(12) United States Patent
Ma et al.

(10) Patent No.: US 11,246,177 B2
(45) Date of Patent: Feb. 8, 2022

(54) UNMANNED AERIAL VEHICLE SYSTEM AND METHOD

(71) Applicant: SZ DJI TECHNOLOGY CO., LTD., Shenzhen (CN)

(72) Inventors: Ning Ma, Shenzhen (CN); Zhipeng Zhang, Shenzhen (CN); Ying Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/883,764

(22) Filed: May 26, 2020

(65) Prior Publication Data

US 2020/0288522 A1 Sep. 10, 2020

Related U.S. Application Data

(63) Continuation of application No. PCT/CN2017/113921, filed on Nov. 30, 2017.

(51) Int. Cl.
*H04W 76/14* (2018.01)
*H04W 4/80* (2018.01)
(Continued)

(52) U.S. Cl.
CPC ......... *H04W 76/14* (2018.02); *H04L 41/0813* (2013.01); *H04L 69/18* (2013.01); *H04W 4/80* (2018.02); *H04W 12/02* (2013.01)

(58) Field of Classification Search
CPC .................................................. H04W 76/14
See application file for complete search history.

(56) References Cited

U.S. PATENT DOCUMENTS

2011/0257813 A1* 10/2011 Coulmeau ............ G08G 5/0013
701/2
2015/0131519 A1 5/2015 Kanabar et al.
(Continued)

FOREIGN PATENT DOCUMENTS

CN 104469719 A 3/2015
CN 104801050 A 7/2015
(Continued)

OTHER PUBLICATIONS

The World Intellectual Property Organization (WIPO) International Search Report for PCT/CN2017/113921 dated Jul. 19, 2018 8 pages.

*Primary Examiner* — Hsinchun Liao
(74) *Attorney, Agent, or Firm* — Anova Law Group, PLLC

(57) ABSTRACT

An unmanned aerial vehicle system includes an unmanned aerial vehicle and a remote controller, where the unmanned aerial vehicle includes a first controller unit configured to determine whether the unmanned aerial vehicle can pair via a first communication unit with the remote controller, and when the unmanned aerial vehicle cannot pair with the remote controller, to send out via a second communication unit pairing information of the unmanned aerial vehicle and version information of a first private communication protocol of the first communication unit, and the remote controller includes a second controller unit configured to determine whether the remote controller can pair via a third communication unit with the unmanned aerial vehicle, and when the remote controller cannot pair with the unmanned aerial vehicle, to send out via a first communication interface pairing information of the remote controller and version information of a second private communication protocol of the third communication unit.

20 Claims, 7 Drawing Sheets

(51) Int. Cl.
*H04L 12/24* (2006.01)
*H04L 29/06* (2006.01)
*H04W 12/02* (2009.01)

(56) References Cited

U.S. PATENT DOCUMENTS

| | | | | |
|---|---|---|---|---|
| 2016/0068264 A1* | 3/2016 | Ganesh | ................ | G05D 1/0676 |
| | | | | 701/2 |
| 2017/0127459 A1* | 5/2017 | Ye | .................. | H04W 12/04 |
| 2018/0024546 A1* | 1/2018 | Ha | .................. | G05D 1/0033 |
| | | | | 701/2 |

FOREIGN PATENT DOCUMENTS

| | | | |
|---|---|---|---|
| CN | 106055373 A | 10/2016 |
| CN | 106598636 A | 4/2017 |
| CN | 106874033 A | 6/2017 |
| CN | 107079256 A | 8/2017 |
| CN | 107079365 A | 8/2017 |
| CN | 107357601 A | 11/2017 |
| WO | 2016065447 A1 | 5/2016 |

* cited by examiner

UNMANNED AERIAL VEHICLE SYSTEM AND METHOD

CROSS-REFERENCE TO RELATED APPLICATION

This application is a continuation of International Application No. PCT/CN2017/113921, filed Nov. 30, 2017, the entire content of which is incorporated herein by reference.

TECHNICAL FIELD

The present disclosure relates to a technical area of unmanned aerial vehicle, and in particular to unmanned aerial vehicle system and related method of pairing.

BACKGROUND

Movable equipment with imaging devices has been in wide use. For example, unmanned aerial vehicles with imaging capacity have been employed in capturing images of target objects, and transmitting the captured images and videos. Unmanned aerial vehicles may use private communication protocols in their communication systems when transmitting images and/or video data. The unmanned aerial vehicles may from time to time need to have the firmware of their private communication protocol updated. However, changes caused by updates in physical layer and/or process flow may cause incompatibility between different versions of private communication protocols. For example, incompatibility or mispairing may occur between the firmware of the private communication protocols of the unmanned aerial vehicle and the remote controller. It may thus be difficult for the user to determine if the incompatibility or the mispairing is in fact due to updating the private communication protocol.

SUMMARY

In accordance with the present disclosure, there is provided an unmanned aerial vehicle system, including an unmanned aerial vehicle and a remote controller, where the unmanned aerial vehicle includes a first communication unit configured to communicate via a first private communication protocol, a second communication unit configured to communicate via a first standard communication protocol, and a first controller unit configured to determine whether the unmanned aerial vehicle can pair via the first communication unit with the remote controller, and when the unmanned aerial vehicle cannot pair with the remote controller, to send out via the second communication unit pairing information of the unmanned aerial vehicle and version information of the first private communication protocol of the first communication unit, and the remote controller includes a third communication unit configured to communicate via a second private communication protocol, a first communication interface configured to communicate with a user device, and a second controller unit configured to determine whether the remote controller can pair via the third communication unit with the unmanned aerial vehicle, and when the remote controller cannot pair with the unmanned aerial vehicle, to send out via the first communication interface pairing information of the remote controller and version information of the second private communication protocol of the third communication unit.

In accordance also with the present disclosure, there is provided a communication method to be executed by an unmanned aerial vehicle system, where the unmanned aerial vehicle system includes an unmanned aerial vehicle and a remote controller, the unmanned aerial vehicle includes a first communication unit to communicate with a first private communication protocol, a second communication unit configured to communicate with a first standard communication protocol, and a first controller unit, and the remote controller includes a third communication unit configured to communicate with a second standard communication protocol and a first communication interface configured to communicate with a user device, the method includes determining, via the first controller unit, whether the unmanned aerial vehicle can pair via the first communication unit with the remote controller, when the unmanned aerial vehicle cannot pair with the remote controller, sending out, via the second communication unit, pairing information of the unmanned aerial vehicle and version information of the first private communication protocol of the first communication unit, determining, via the second controller unit, whether the remote controller can pair via the third communication unit with the unmanned aerial vehicle, and when the remote controller cannot pair with the unmanned aerial vehicle, sending out, via the first communication interface, pairing information of the remote controller and version information of the second private communication protocol of the third communication unit.

BRIEF DESCRIPTION OF THE DRAWINGS

Objectives, features, and advantages of the embodiments are more readily understandable in reference to the accompanying drawings described below. The accompanying drawings are for illustration purpose only and are not necessarily to scale. In the accompanying drawings, the embodiments are described without limiting the scope of the present disclosure.

It should be noted that the drawings are not necessarily drawn to scale, rather emphasis is on illustrating the principles of the technology disclosed herein. In addition, for the sake of clarity, like reference numerals refer to like elements throughout the drawings.

DETAILED DESCRIPTION OF THE EMBODIMENTS

Descriptions are provided below to embodiments of the present disclosure in view of the drawings. The present disclosure, however, is not to be limited to the embodiment(s) detailed below. Moreover, description of certain well-known techniques or knowledge is minimized or omitted in favor of brevity and to avoid unnecessary confusion to understanding of the present disclosure.

The present disclosure provides an unmanned aerial vehicle, which includes two communication units, namely a first communication unit to communicate with a private communication protocol and a second communication unit to communicate with a standard communication protocol. When the unmanned aerial vehicle is not able to pair up with a corresponding remote controller due to incompatibility of different versions of private communication protocols, initial communication is established between the standard communication protocol of the unmanned aerial vehicle and the user device. Therefore, versions of the private communication protocols from the unmanned aerial vehicle and/or the remote controller are obtained via a user device, updating of the private communication protocol that is lower in grade or older is version is then carried out. Communication between the unmanned aerial vehicle and the remote controller may thereafter be established via compatible private communication protocols.

Figure 1:
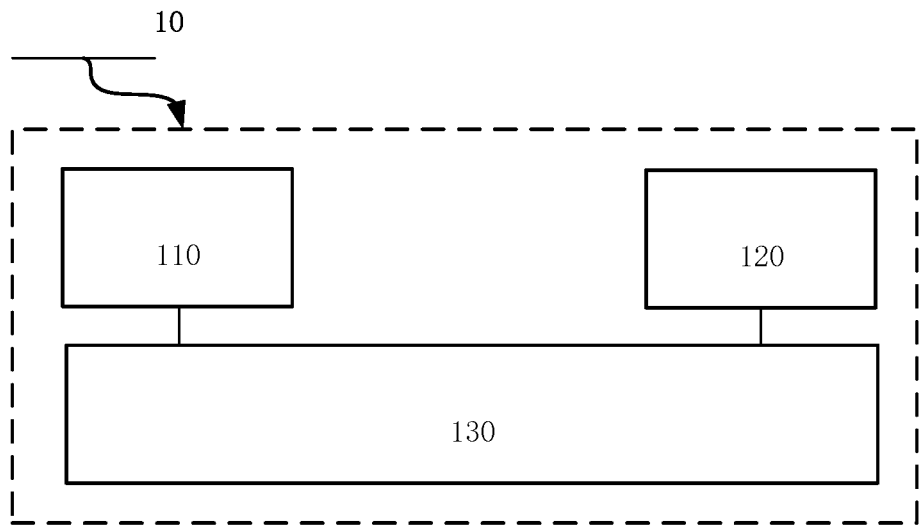
FIG. 1 is a schematic box diagram of an unmanned aerial vehicle according to one embodiment of the present disclosure.

FIG. 1 is a schematic box diagram of an unmanned aerial vehicle. As illustratively depicted in FIG. 1, the unmanned aerial vehicle 10 includes a first communication unit 110, a second communication unit 120, and a first controller unit 130.

The first communication unit 110 may be configured to communicate via private communication protocol. For example, the first communication unit 110 may communicate with the remote controller via private communication protocol to transmit or receive image, video, and/or instruction data. The private communication protocol may be OcuSync protocol.

The second communication unit 120 may be configured to communicate via a standard communication protocol. For example, the second communication unit 120 may communicate with the user device via WiFi communication protocol, to transmit data and/or instruction information. In some embodiments, the second communication unit 120 may communicate with the user device via other suitable standard communication protocol, such as Bluetooth ("BT") protocol.

The first controller unit 130 may be configured to determine whether the unmanned aerial vehicle 10 can pair up with the remote controller via the first communication unit 110. When the pairing is not enabled, pairing information of the unmanned aerial vehicle 10 and version information of the first private communication protocol of the first communication unit 110 are sent out by the second communication unit 120. The pairing information of the unmanned aerial vehicle 10 may include identification information of the unmanned aerial vehicle 10 and security information such as passwords used for pairing with the remote controller.

When the first private communication protocol of the unmanned aerial vehicle is determined to be of an older version or of a lower grade, an updated first private communication protocol may be received by the first controller unit 130 via the second communication unit 120, such that the first communication unit 110 may then use the updated first private communication protocol. The updated first private communication protocol may be obtained from the user device, as will be detailed below.

In some embodiments, the first private communication protocol of the unmanned aerial vehicle 10 may be of a newer version or of a higher grade, and the second private communication protocol of the remote controller may need to be upgraded or updated to pair up with the first private communication protocol of the unmanned aerial vehicle 10. Under these circumstances, the first controller unit 130 may be configured to send out the first private communication protocol as used by the first communication unit 110 via the second communication unit 120, to update the private communication protocol of the remote controller. More details are provided below.

In some embodiments, and to avoid interference, the first communication unit 110 and the second communication unit 120 of the unmanned aerial vehicle 10 may each be independently working at different frequency. For example, the first communication unit 110 may communicate via OcuSync private communication protocol, and the second communication unit 120 may communicate via WiFi standard. Communication via OcuSync private communication protocol may work at the frequency of 5.8 GHz, and communication via WiFi standard communication protocol may work at the frequency of 2.4 GHz. Alternatively, communication via OcuSync private communication protocol may work at the frequency of 2.4 GHz, and communication via WiFi standard communication protocol may work at the frequency of 5.8 GHz.

Figure 2:
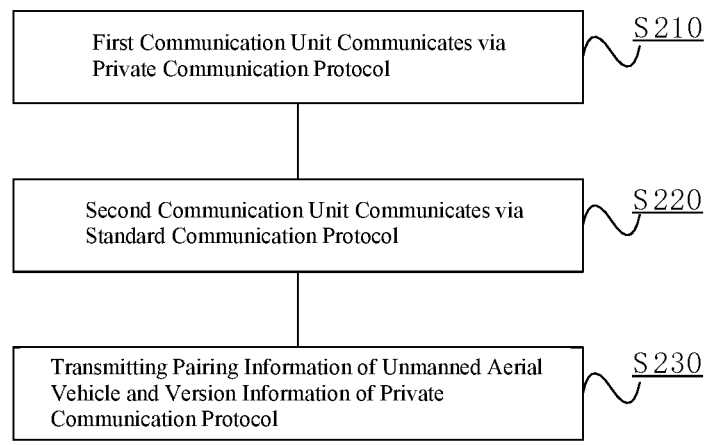
FIG. 2 is a schematic flow chart diagram of a communication method executed by an unmanned aerial vehicle according to another embodiment of the present disclosure.

FIG. 2 is a schematic flow chart diagram of a communication method executed by an unmanned aerial vehicle. For example, and as illustratively depicted in FIG. 1, the communication method may include an unmanned aerial vehicle 10 which in turn includes a first communication unit 110, a second communication unit 120, and a first controller unit 130. Component steps of the communication method as illustratively depicted in FIG. 2 are described in more detail below.

Steps of the communication method as represented via boxes are not necessarily executed in the order the boxes are presented. Rather, one or more of the steps may be executed out of the order shown and may be executed independently or in collaboration with other step(s) shown in the flow chart.

At step S210, the first communication unit of the unmanned aerial vehicle is provided a first private communication protocol for communication. The first communication unit may employ OcuSync private protocol when communicating with the remote controller.

At step S220, the second communication unit of the unmanned aerial vehicle is provided a first standard communication protocol for communication. The second communication unit may employ WiFi communication protocol when communicating with the user device.

At step S230, the first control unit of the unmanned aerial vehicle determined whether the unmanned aerial vehicle can pair up via the first communication unit with the remote controller. When the first controller unit determines that the pairing is not enabled, the first controller unit sends out via the second communication unit pairing information of the unmanned aerial vehicle and version information of the first private communication protocol used by the first communication unit, to enable upgrading of the first private communication protocol or of the second private communication protocol. The pairing information of the unmanned aerial vehicle may include identification information of the unmanned aerial vehicle and security information used for pairing.

The unmanned aerial vehicle may obtain updated first private communication protocol via the second communication unit, so as for the first communication unit to communicate with the updated first private communication protocol. This happens when the first private communication protocol used by the unmanned aerial vehicle is of a version older than or of a grade lower than a version or a grade of the second private communication protocol used by the remote controller. As will be detailed below, the updated first private communication protocol may be provided locally by the remote controller or from the user device via the internet.

The unmanned aerial vehicle may send out via the second communication unit the first private communication protocol used by the first communication unit. This happens when the first private communication protocol used by the unmanned aerial vehicle is of a version newer than or of a grade higher than a version or grade of the second private communication protocol used by the remote controller. As will be detailed below, an updated second private communication protocol may be provided to the remote controller by the unmanned aerial vehicle locally or by the user device via the internet.

In some embodiments, the first communication unit and the second communication unit may each independently work at a different frequency, to avoid interference to each other. For example, the first communication unit may work at the frequency of 5.8 GHz, the second communication unit may work at the frequency of 2.4 GHz, and vice versa.

Having the communication method executed by the unmanned aerial vehicle described above, below are more details on the unmanned aerial vehicle system including the unmanned aerial vehicle and the remote control, and the communication method executed by the unmanned aerial vehicle system.

Figure 3:
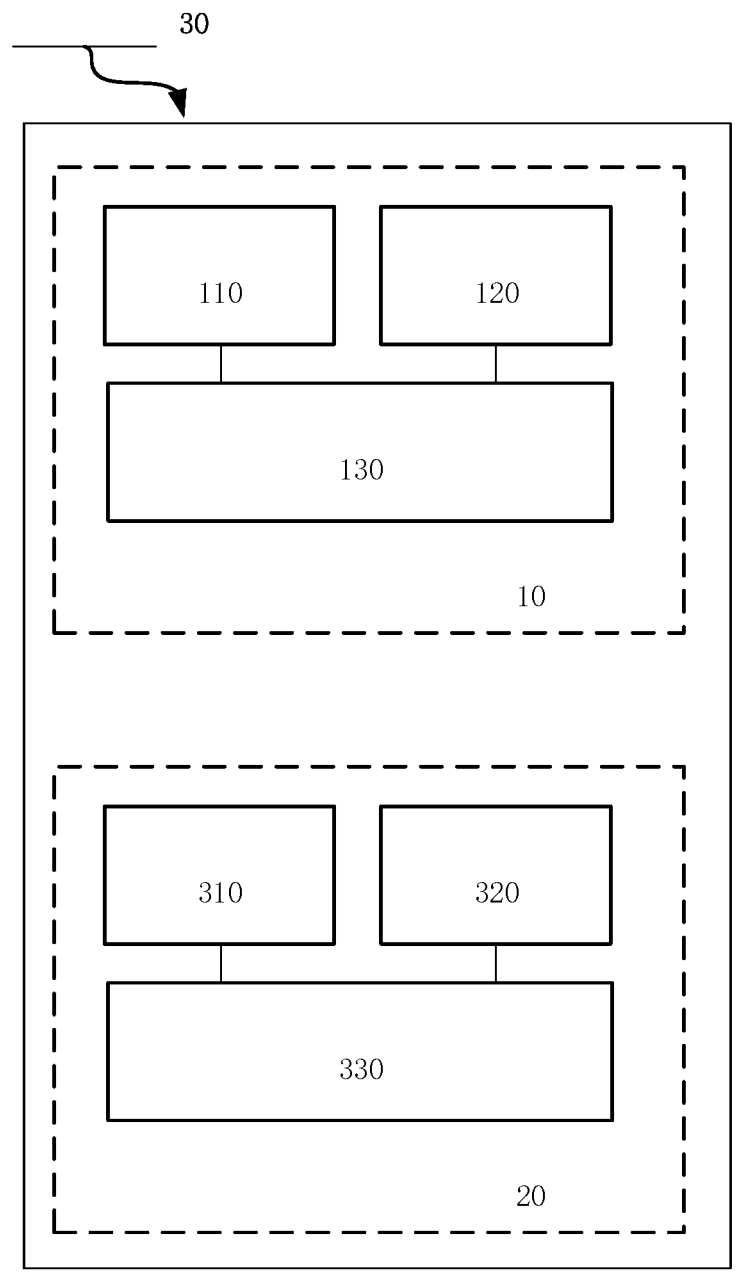
FIG. 3 is a schematic box diagram of an unmanned aerial vehicle according to yet another embodiment of the present disclosure.

FIG. 3 is a schematic structural diagram of an unmanned aerial vehicle system. As illustratively depicted in FIG. 3, the unmanned aerial vehicle system 30 includes an unmanned aerial vehicle 10 and a remote controller 20. As illustratively depicted in FIG. 1, the unmanned aerial vehicle 10 may include a first communication unit 110, a second communication unit 120, and a first controller unit 130, and the remote controller 20 may include a third communication unit 310, a first communication interface 320, and a second controller unit 330. Components of the unmanned aerial vehicle system 30 illustratively depicted in FIG. 3 are described in more detail below.

As illustratively depicted in FIG. 1, the first communication unit 110 of the unmanned aerial vehicle 10 may be configured to communicate via a first private communication protocol such as OcuSync private communication protocol, and the second communication unit 120 may be configured to communicate with a first standard communication protocol such as WiFi communication protocol or Bluetooth (BT) communication protocol.

The first controller unit 130 of the unmanned aerial vehicle 10 may be configured to determine whether the unmanned aerial vehicle 10 is able to pair up via the first communication unit 110 with the remote controller 20. When the pairing is not enabled, the unmanned aerial vehicle 10 sends out via the second communication unit 120 pairing information of the unmanned aerial vehicle 10 and version information of the first private communication protocol used by the first communication unit. The pairing information of the unmanned aerial vehicle 10 may include identification information of the unmanned aerial vehicle and security information used for pairing.

When the first private communication protocol of the unmanned aerial vehicle 10 is of a version older or of a grade lower than a version or grade of the second private communication protocol of the remote controller 20, an updated first private communication protocol may be obtained via the second communication unit 120 from the user device, and thereafter the first communication unit 110 may employ the updated first private communication protocol when communicating with the remote controller 20. In some embodiments, when the first private communication protocol of the unmanned aerial vehicle 10 is of a version newer or of a grade higher than a version or grade of the second private communication protocol of the remote controller 20, the first private communication protocol of the first communication unit 110 is sent out to the user device via the second communication unit 120. Accordingly, the remote controller 20 may obtain from the user device the first private communication protocol, with which to establish communication connection with the unmanned aerial vehicle 10.

Accordingly also, the third communication unit 310 of the remote controller 20 may be provided with the same private communication protocol as the private communication protocol employed at the first communication unit 110 of the unmanned aerial vehicle 10, such that the remote controller 20 may communicate with and hence control the unmanned aerial vehicle 10.

The remote controller 20 may establish communication with the user device via the first communication interface 320. For example, the first communication interface 320 of the remote controller 20 may establish communication with the user device via a USB protocol. The first communication interface 320 may establish communication with the user device via other suitable methods, such as serial communication or infrared communication.

The second controller unit 330 of the remote controller 20 may be configured to determine whether the remote controller 20 is able to pair up via the third communication unit 310 with the unmanned aerial vehicle 10. When the second controller unit 330 determines that the remote controller 20 is unable to pair up with the unmanned aerial vehicle 10, the second controller unit 330 sends out via the first communication interface 320 to the user device the pairing information of the remote controller 20 and version information of the second private communication protocol of the third communication unit 310. The pairing information of the remote controller 20 may include identification information of the remote controller 20, and security information such as password of the unmanned aerial vehicle 10 for pairing.

When the second private communication protocol of the remote controller 20 is of a version older than or of a grade lower than a version or a grade of the first private communication protocol of the unmanned aerial vehicle, the remote controller 20 may obtain an updated second private communication protocol from the user device via the first communication interface 320, and the third communication unit 310 of the remote controller 20 may then use the updated second private communication protocol to communicate with the unmanned aerial vehicle 10. When the second private communication protocol of the remote controller 20 is of a version newer than or of a grade higher than a version or a grade of the first private communication protocol of the unmanned aerial vehicle, the remote controller 20 may send via the first communication interface 320 to the user device the second private communication protocol, and the unmanned aerial vehicle 10 may obtain the second private communication protocol from the user device to establish communication with the remote controller 20.

Figure 4:
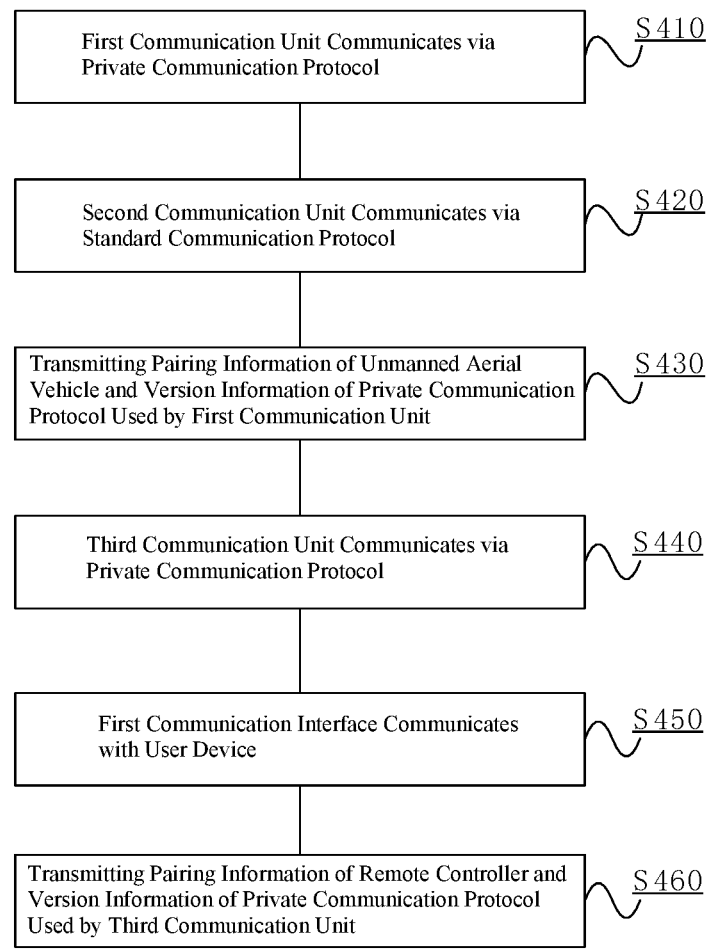
FIG. 4 is a schematic flow chart diagram of a communication method executed by an unmanned aerial vehicle according to yet another embodiment of the present disclosure.

FIG. 4 is a schematic flow chart diagram of a communication method executed by the unmanned aerial vehicle system. The communication method may be executed by the unmanned aerial vehicle system 30 which in turn includes the unmanned aerial vehicle 10 and the remote controller 20 as illustratively depicted in FIG. 3. Various components of FIG. 4 are described below.

Steps of the communication method as represented via boxes are not necessarily executed in the order the boxes are presented. Rather, one or more of the steps may be executed out of the order shown and may be executed independently or in collaboration with other step(s) shown in the flow chart.

At step S410, the first communication unit of the unmanned aerial vehicle is provided with the first private communication protocol for communication. The first communication unit may employ OcuSync private communication protocol when communicating with the remote controller.

At step S420, the second communication unit of the unmanned aerial vehicle is provided a first standard communication protocol for communication. The second communication unit may employ WiFi communication protocol or BT communication protocol when communicating with the user device.

At step S430, the first controller unit of the unmanned aerial vehicle determines whether the unmanned aerial vehicle is able to pair up via the first communication unit with the remote controller. When pairing is not enabled, pairing information and version information of the first private communication protocol of the first communication unit are sent out via the second communication unit. For example, the pairing information of the unmanned aerial vehicle may include identification information of the unmanned aerial vehicle, and security information such as password used for pairing with the remote controller.

At step S440, the third communication unit of the remote controller communities with the same private communication protocol as the private communication protocol used by the first communication unit of the unmanned aerial vehicle.

At step S450, the remote controller communicates with the user device via the first communication interface.

At step S460, the second controller unit of the remote controller determines whether the remote controller is able to pair up via the third communication unit with the unmanned aerial vehicle. When the pairing is not enabled, pairing information and version information of the second private communication protocol of the third communication unit of the remote controller are sent out via the first communication interface. For example, the pairing information of the remote controller may include identification information of the remote controller, and security information such as password used for pairing with the unmanned aerial vehicle.

When the first private communication protocol used by the first communication unit of the unmanned aerial vehicle is of a version older than or of a grade lower than a version or a grade of the second private communication protocol of the third communication unit of the remote controller, the unmanned aerial vehicle may obtain an updated first private communication protocol from the user device via the second communication unit, and the first communication unit may use the updated first private communication protocol when communicating with the remote controller.

When the first private communication protocol used by the first communication unit of the unmanned aerial vehicle is of a version newer than or of a grade higher than a version or a grade of the second private communication protocol of the third communication unit of the remote controller, the first private communication protocol used by the first communication unit may be sent out to the user device via the second communication unit. Accordingly, the remote controller may then obtain via the user device a current version which is the newer version of the private communication protocol from the unmanned aerial vehicle to establish communication with the unmanned aerial vehicle.

Having the unmanned aerial vehicle and the communication method executed by the unmanned aerial vehicle described above, below are more details on communication among the unmanned aerial vehicle, the remoter controller, and the user device, and a method executed by the user device.

Figure 5:
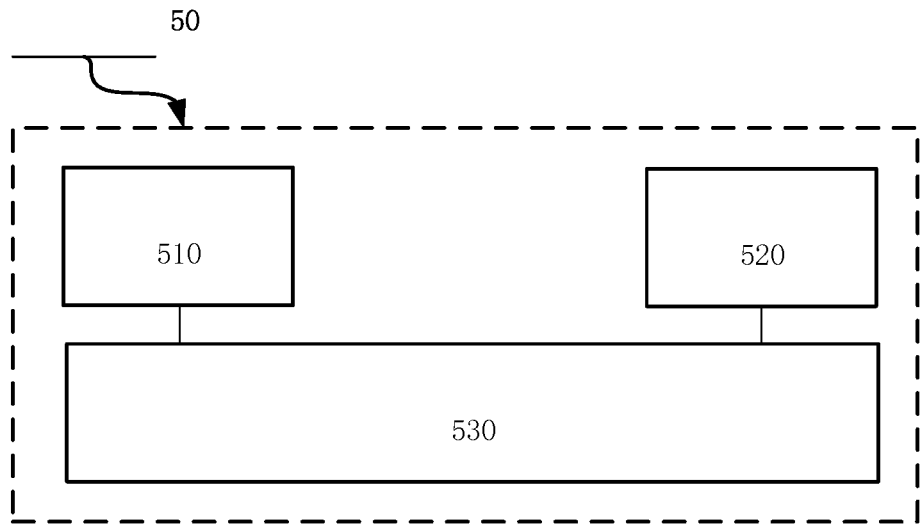
FIG. 5 is a schematic box diagram of a user device according to yet another embodiment of the present disclosure.

FIG. 5 is a schematic box diagram of a user device according to an embodiment of the present disclosure. As illustratively depicted in FIG. 5, the user device 50 includes a fourth communication unit 510, a second communication interface 520, and a third controller unit 530.

The fourth communication unit 510 is configured to communicate via a standard communication protocol. For example, the fourth communication unit 510 may communicate via WiFi communication protocol or BT communication protocol. When pairing via private communication protocols between the unmanned aerial vehicle and the remote controller is not enabled, initial communication with the unmanned aerial vehicle may be established via the fourth communication unit 510 of the user device 50.

The second communication interface 520 may be configured to communicate with the remote controller. For example, the second communication interface 520 of the user device 50 may communicate with the first communication interface 320 of the remote controller. In particular, the communication may be via a USB protocol, or any other suitable protocols such as serial communication or infrared communication protocols.

The third controller unit 530 may receive, via the fourth communication unit 510, pairing information and version information of the first private communication protocol of the unmanned aerial vehicle. The third controller unit 530 may receive, via the second communication interface 520, pairing information and version information of the second private communication protocol of the remoter controller. The pairing information of the unmanned aerial vehicle may include identification information of the unmanned aerial vehicle and security information for pairing. The pairing information of the remote controller may include identification information of the remote controller and security information for pairing.

The third controller unit 530 may conduct a comparison between the version information of the first private communication protocol employed by the unmanned aerial vehicle and the version information of the second private communication protocol employed by the remote controller. The third controller unit 530 may cause either of the first private communication protocol and the second private communication protocol to be updated according to the comparison.

For example, when the first private communication protocol is of a version newer than or of a grade higher than a version or a grade of the second private communication protocol, the user device 50 may receive, via the fourth communication unit 510, the first private communication protocol of the unmanned aerial vehicle, and then transmits the first private communication protocol to the remote controller via the second communication interface 520.

When the second private communication protocol of the remote controller is of a version newer than or of a grade higher than a version or a grade of the first private communication protocol of the unmanned aerial vehicle, the user device 50 receives, via the second communication interface 520, the second private communication protocol, and transmits the second private communication protocol to the unmanned aerial vehicle via the fourth communication unit 510.

In some embodiments, the user device 50 may also obtain the updated first private communication protocol or the updated second private communication protocol through the internet. The updated first private communication protocol may be a second updated first private communication protocol that is newer in version or higher in grade than the updated first private communication protocol. The updated second private communication protocol may be a second updated second private communication protocol that is newer in version or higher in grade than the updated second private communication protocol. Therefore, when updating via the internet, both the first private communication protocol and the second private communication protocol may be updated to a currently updated version. The user device 50 may transmit, via the fourth communication unit 510, the currently updated version of the private communication protocol to the unmanned aerial vehicle, and may transmit, via the second communication interface 520, the currently updated version of the private communication protocol to the remote controller. In this embodiment, no determination is necessary on which of the vehicle and second private communication protocols is more current; and instead, both protocols are replaced with a most current version via the internet.

Figure 6:
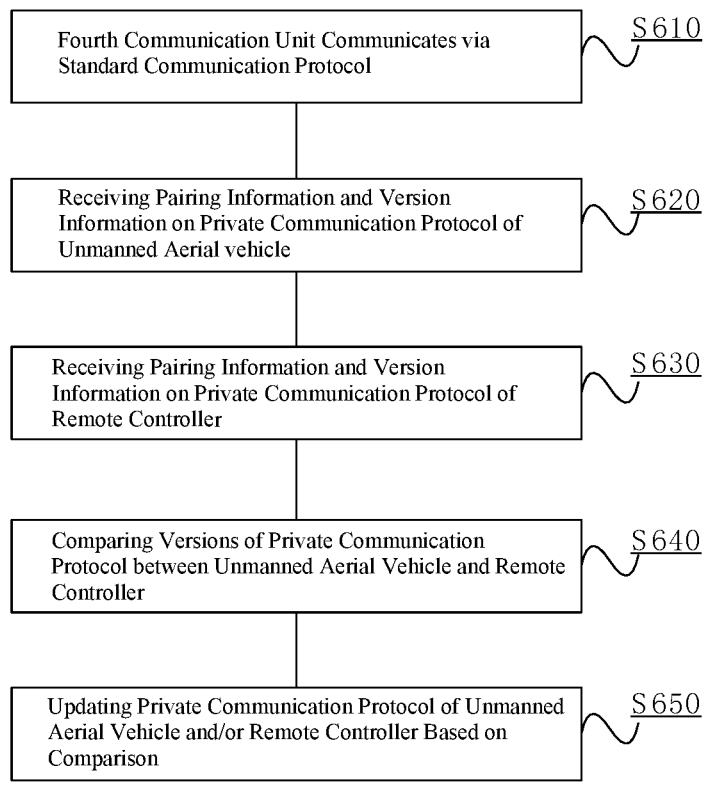
FIG. 6 is a schematic flow chart diagram of a communication method executed by a user device according to yet another embodiment of the present disclosure.

FIG. 6 is a schematic flow chart diagram of a communication method to be executed by a user device. The communication method may be executed by the user device 50 as illustratively depicted in FIG. 5. Description to various component steps of the communication method illustratively depicted in FIG. 6.

Steps of the communication method as represented via boxes are not necessarily executed in the order the boxes are presented. Rather, one or more of the steps may be executed out of the order shown and may be executed independently or in collaboration with other step(s) shown in the flow chart.

At box S610, the fourth communication unit of the user device communicates via a standard communication protocol. For example, the fourth communication unit of the user device communicates with the unmanned aerial vehicle via a WiFi communication protocol or a BT communication protocol.

At box S620, the third controller unit of the user device receives, via the fourth communication unit, pairing information of the unmanned aerial vehicle and version information of the first private communication protocol of the unmanned aerial vehicle. For example, the pairing information of the unmanned aerial vehicle includes identification information of the unmanned aerial vehicle and security information such as passwords for pairing with the remote controller.

At box S630, the third controller unit of the user device receives, via the second communication interface, pairing information and version information of the second private communication protocol of the remote controller. For example, the pairing information of the remote controller includes identification information of the remote controller and security information such as password for pairing with the unmanned aerial vehicle.

At box S640, the third controller unit of the user device conducts a comparison between the first private communication protocol and the second private communication protocol of the remote controller.

At box S650, the third controller unit of the user device updates the first private communication protocol of the unmanned aerial vehicle or the second private communication protocol at least according to the comparison. For example, when the first private communication protocol of the unmanned aerial vehicle is of a version newer than or of a grade higher than a version or a grade of the second private communication protocol of the remote controller, the first private communication protocol of the unmanned aerial vehicle is received via the fourth communication unit and then is sent to the remote controller via the second controller unit. When the second private communication protocol of the remote controller is of a version newer than or of a grade higher than a version or a grade of the first private communication protocol of the unmanned aerial vehicle, the second private communication protocol of the remote controller is received at the second communication interface, and is then sent to the unmanned aerial vehicle via the fourth communication unit. The third controller unit may, via the internet, obtain the most current version of private communication protocol. The most current version of private communication protocol may then be sent to the unmanned aerial vehicle via the fourth communication unit and to the remote controller via the second communication interface. Accordingly, the unmanned aerial vehicle and the remote controller may communicate with each other via the most current version of the private communication protocol.

As illustratively depicted in FIG. 7A through FIG. 7D, the communication method and system are described taking OcuSync protocol as an example of the private communication protocol. Of course, other suitable private communication protocols may be employed in the communication method and system according various embodiments of the present disclosure.

Figure 7A:
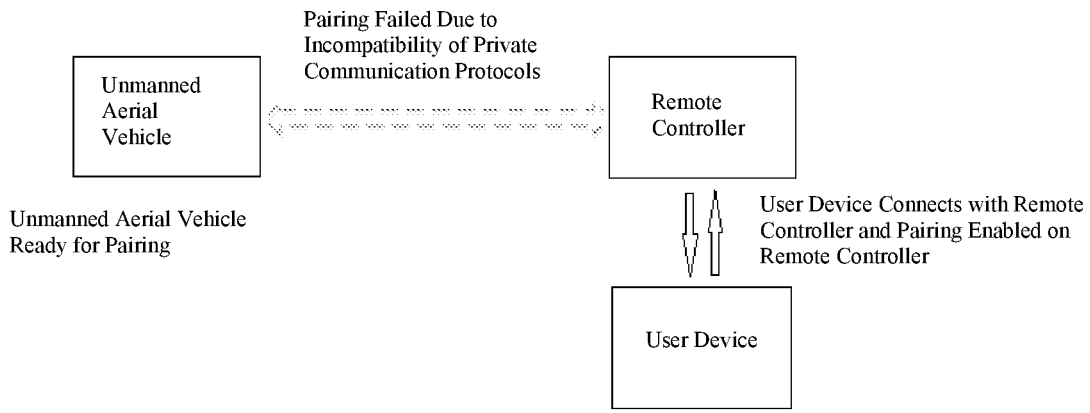
FIG. 7A through FIG. 7D are each a schematic diagram of updating of private communication protocol according to yet another embodiment of the present disclosure.

As illustratively depicted in FIG. 7A, the unmanned aerial vehicle and the remote controller are configured for pairing. For example, a special or designated button on the unmanned aerial vehicle may be pressed or triggered as instruction for pairing with the remote controller via the user device which is in turn connected to the remote controller. The user device may communicate with the remote controller via a USB protocol. The user device may be a mobile phone.

As illustratively depicted in FIG. 7A, the first private communication protocol of the unmanned aerial vehicle is not compatible with the second private communication protocol of the remote controller, such that pairing between the unmanned vehicle and the remote controller is not enabled.

Figure 7B:
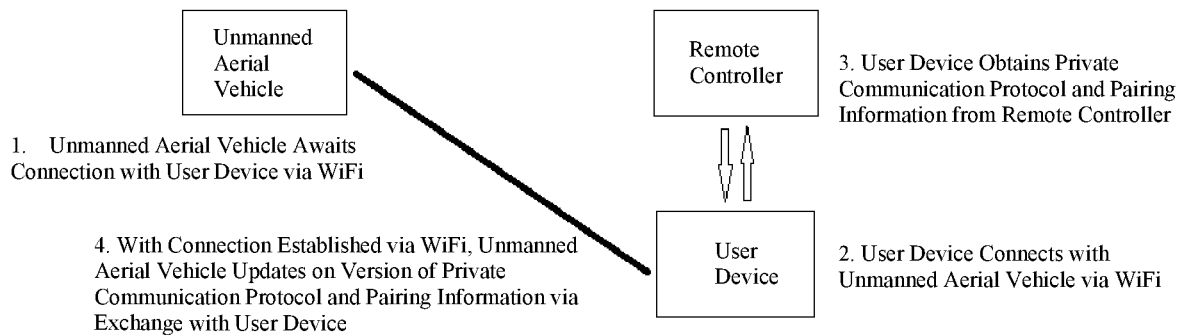

As illustratively depicted in FIG. 7B, the unmanned aerial vehicle initiates communication via the WiFi protocol, attempts to communicate with the user device. Upon receiving the WiFi signal, the user device establishes communicative connection with the unmanned aerial vehicle. In addition, and via the communicative connection with the remote controller, the user device obtains pairing information and version information of the second private communication protocol of the remote controller. Through communicative connection with the unmanned aerial vehicle via the WiFi protocol, the user device obtains version information and pairing information of the first private communication protocol of the unmanned aerial vehicle. The pairing information of the unmanned aerial vehicle includes identification information of the unmanned aerial vehicle and security information for pairing with the remote controller. The pairing information of the remote controller includes identification information of the remote controller and security information for pairing with the unmanned aerial vehicle.

Figure 7C:
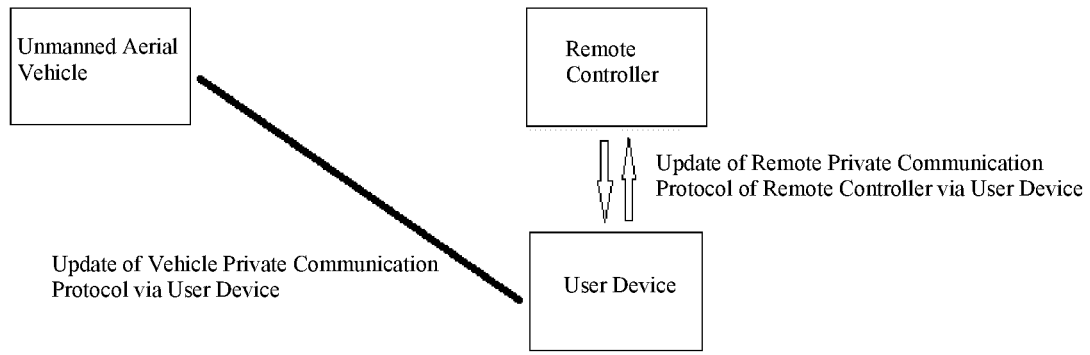

As illustratively depicted in FIG. 7C, the user device determines whether the first private communication protocol of the unmanned aerial vehicle and/or the second private communication protocol of the remote controller needs an update. Such updating may be carried out via one or more of the following methods.

One such method is to update locally, namely to retrieve and utilize the local copy of the private communication protocol at the unmanned aerial vehicle or the remote controller. In particular, and when the first private communication protocol is of a version newer than or of a grade higher than a version or a grade of the second private communication protocol, the unmanned aerial vehicle may transmit a copy of the locally present first private communication protocol to the user device via for example WiFi connection, and the first private communication protocol is then transmitted in turn by the user device to the remote controller via for example a USB connection. When the second private communication protocol of the remote controller is of a version newer than or of a grade higher than a version or a grade of the first private communication protocol of the unmanned aerial vehicle, the remote controller may transmit a copy of the locally present second private communication protocol to the user device via for example a USB connection, and the sent copy of the second private communication protocol is then sent to the unmanned aerial vehicle by the user device via for example WiFi connection. Accordingly, the private communication protocol of the unmanned aerial vehicle and/or the remote controller is updated.

Another method of updating the private communication protocol is via the internet. The user device is connected to the internet to obtain the most current version of the private communication protocol. The user may obtain the most current version via for example downloading. Once downloaded, the most current version of the private communication protocol may be sent to the unmanned aerial vehicle via for example a WiFi connection and to the remote controller via for example a USB connection. Via the internet, the private communication protocols at both the unmanned aerial vehicle and at the remote controller are updated.

Figure 7D:
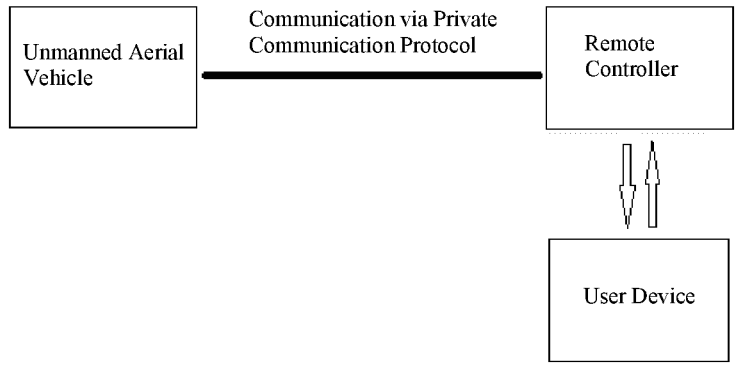

As illustratively depicted in FIG. 7D, after the private communication protocols are updated, pairing between the unmanned aerial vehicle and the remote controller may then be enabled.

When the remote controller supports both the private communication protocol and the standard communication protocol, the remote controller may directly establish communicative connection with the unmanned aerial vehicle using the standard communication protocol, without having to go through the user device, and to complete version update directly on the private communication protocol. In this capacity, the remote controller is assuming at least some of the communication functions of the user device.

Via embodiment(s) of the present disclosure, when pairing is not enabled between the unmanned aerial vehicle and remote controller due to incompatibility of versions of the private communication protocols, an initial communicative connection may be established between the unmanned aerial vehicle and the remote controller via standard communication protocol. Updating of the private communication protocol(s) is carried out thereafter to eventually enable pairing and communication between the unmanned aerial vehicle and the remote controller via respective private communication protocols.

In addition, embodiment(s) of the present disclosure may be realized via a computer program product. For example, the computer program product may be a computer readable medium. The computer readable medium includes thereupon a computer program, to be executed by a processor of a computer to perform one or more steps of the communication method described herein.

Figure 8:
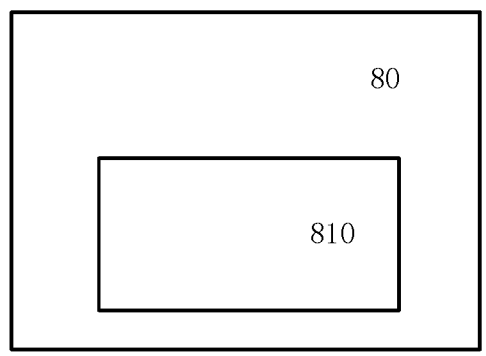
FIG. 8 is a schematic diagram of a computer readable program medium according to yet another embodiment of the present disclosure.

For example, FIG. 8 is a schematic diagram of a computer readable medium 80 according to one embodiment of the present disclosure. As illustratively depicted in FIG. 8, the computer readable medium 80 includes a computer program 810. When executed by a processor of the computer, the computer program 810 causes the processor to perform one or more steps of the communication method as illustratively depicted in FIG. 2, FIG. 4, or FIG. 6. The computer readable medium 80 may include but is not limited to semiconductor storage medium, optical storage medium, magnetic storage medium, or any other suitable computer readable medium.

Above is a description of method and apparatus according to embodiment(s) of the present disclosure. It is understood that the method disclosed herein is illustrative only. Methods of the present disclosure are not limited to the boxes and orders employed herein above.

It is understood that embodiment(s) of the present disclosure may be executed via software, hardware, and any combinations thereof. The present disclosure in some embodiments provides configuration or programming of software, code and/or other data structures on computer readable medium of optical medium (such as CD-ROM), floppy disc, or hard disc, or of firmware or microcode on one or more ROM, RAM, or PROM chips, or downloadable software images and shared database of one or more modules. Software or firmware or such a configuration may be installed on a computing device, such that one or more processors of the computing device may execute the technical solutions referenced in the embodiment(s) of the present disclosure.

In addition, functional modules or various features of a device or an apparatus employed in the embodiment(s) of the present disclosure may be implemented or performed via a circuit, where the circuit may be one or more integrated circuits. The circuits employed in the embodiment(s) of the present disclosure may include general-purpose processor, digital signal processors (DSP), application-specific integrated circuits (ASICs), general-purpose integrated circuits, field-programmable gate arrays (FPGA), other programmable logic devices, discrete gate or transistor logic, discrete hardware components, or any combinations of the above. A general-purpose processor may be a microprocessor, or the processor may be an existing processor, a controller, microcontroller, or a state machine. The above-mentioned general-purpose processor or each of the circuits may be configured by a digital circuit, or may be configured by a logic circuit. In addition, as advanced technologies in the semiconductor area become more available in replacing integrated circuits, such advanced technologies in the semiconductor area may also be implemented or employed in the embodiment(s) of the present disclosure.

The program running on devices according to embodiment(s) of the present disclosure may be programs employed in computers via controls on central processing unit (CPU). The program or the information processed by the program may be temporarily stored in volatile memory (such as random-access memory RAM), hard disk drive (HDD), non-volatile memory (such as flash memory), or other memory systems. The program for realizing various functions of the embodiment(s) of the present invention may be recorded on a computer-readable recording medium. Corresponding functions can be realized by causing a computer system to read programs recorded on the recording medium and to execute the programs. The "computer system" herein may be a computer system embedded in a device and may include an operating system or hardware (such as a peripheral device).

As shown above, detailed description has been provided to various embodiments of the present disclosure. However, the above-mentioned embodiments are not necessarily limited to any specific structures, and the present disclosure also includes any design changes that do not depart from the gist of the present disclosure. In addition, the present invention can be modified within the scope of the claims, and the embodiments obtained via integrating the technical features disclosed in the different embodiments are also included in the technical scope of the present disclosure. Moreover, components having the same effects described in the above embodiments may be interchangeable between one and another.

What is claimed is:

1. An unmanned aerial vehicle system, comprising an unmanned aerial vehicle and a remote controller, wherein:
   the unmanned aerial vehicle includes:
      a first communication unit configured to communicate via a first private communication protocol;
      a second communication unit configured to communicate via a first standard communication protocol; and
      a first controller unit configured to determine whether the unmanned aerial vehicle can pair via the first communication unit with the remote controller, and when the unmanned aerial vehicle cannot pair with the remote controller, to send out via the second communication unit pairing information of the unmanned aerial vehicle and version information of the first private communication protocol of the first communication unit; and
   the remote controller includes:
      a third communication unit configured to communicate via a second private communication protocol;
      a first communication interface configured to communicate with a user device; and
      a second controller unit configured to determine whether the remote controller can pair via the third communication unit with the unmanned aerial vehicle, and when the remote controller cannot pair with the unmanned aerial vehicle, to send out via the first communication interface pairing information of the remote controller and version information of the second private communication protocol of the third communication unit.

2. The unmanned aerial vehicle system of claim 1, wherein the first controller unit is further configured to receive via the second communication unit an updated first private communication protocol for use by the first communication unit.

3. The unmanned aerial vehicle of claim 1, wherein the second controller unit is further configured to receive via the first communication interface an updated second private communication protocol for use by the third communication unit.

4. The unmanned aerial vehicle system of claim 1, wherein the first controller unit is further configured to send out via the second communication unit the first private communication protocol of the first communication unit.

5. The unmanned aerial vehicle system of claim 1, wherein the second controller unit is further configured to send out via the first communication interface the second private communication protocol of the third communication unit.

6. The unmanned aerial vehicle system of claim 1, wherein the pairing information of the unmanned aerial vehicle includes vehicle identification information and vehicle safety information for pairing.

7. The unmanned aerial vehicle system of claim 1, wherein the pairing information of the remote controller includes remote identification information and remote safety information for pairing.

8. The unmanned aerial vehicle system of claim 1, wherein at least one of the first private communication protocol and the second private communication protocol includes OcuSync communication protocol.

9. The unmanned aerial vehicle system of claim 1, wherein the first standard communication protocol includes a WiFi communication protocol or a Bluetooth communication protocol.

10. The unmanned aerial vehicle system of claim 1, wherein the first communication interface communicates via an USB protocol.

11. A communication method to be executed by an unmanned aerial vehicle system, wherein the unmanned aerial vehicle system includes an unmanned aerial vehicle and a remote controller, the unmanned aerial vehicle includes a first communication unit configured to communicate with a first private communication protocol, a second communication unit configured to communicate with a first standard communication protocol, and a first controller unit, and the remote controller includes a third communication unit configured to communicate with a second private communication protocol and a first communication interface configured to communicate with a user device, the method comprising:
   determining, via the first controller unit, whether the unmanned aerial vehicle can pair via the first communication unit with the remote controller;
   when the unmanned aerial vehicle cannot pair with the remote controller, sending out, via the second communication unit, pairing information of the unmanned aerial vehicle and version information of the first private communication protocol of the first communication unit;
   determining, via the second controller unit, whether the remote controller can pair via the third communication unit with the unmanned aerial vehicle; and
   when the remote controller cannot pair with the unmanned aerial vehicle, sending out, via the first communication interface, pairing information of the remote controller and version information of the second private communication protocol of the third communication unit.

12. The communication method of claim 11, further comprising:
   receiving, by the first controller unit via the second communication unit, an updated first private communication protocol; and
   providing the updated first private communication protocol to the first communication unit.

13. The communication method of claim 11, further comprising:
   receiving, by the second controller unit via the first communication interface, an updated second private communication protocol; and
   providing the updated second private communication protocol to the third communication unit.

14. The communication method of claim 11, further comprising:
   sending out, by the first controller unit via the second communication unit, the first private communication protocol.

15. The communication method of claim 11, further comprising:
   sending out, by the second controller unit via the first communication interface, the second private communication protocol.

16. The communication method of claim 11, wherein the pairing information of the unmanned aerial vehicle includes vehicle identification information and vehicle safety information for pairing.

17. The communication method of claim 11, wherein the pairing information of the remote controller includes remote identification information and remote safety information for pairing.

18. The communication method of claim 11, wherein at least one of the first private communication protocol and the second private communication protocol includes OcuSync communication protocol.

19. The communication method of claim 11, wherein the first standard communication protocol includes WiFi communication protocol or a Bluetooth communication protocol.

20. The communication method of claim 11, wherein the first communication interface communicates via an USB protocol.

* * * * *